(12) United States Patent
Ishizaka et al.

(10) Patent No.: US 6,920,969 B2
(45) Date of Patent: Jul. 26, 2005

(54) ONE-WAY CLUTCH

(75) Inventors: Takashi Ishizaka, Saitama (JP);
Masatoshi Akagi, Saitama (JP);
Kiyotaka Fukui, Kumamoto (JP);
Tadashi Miyamoto, Kumamoto (JP)

(73) Assignees: Honda Giken Kogyo Kabushiki Kaisha, Tokyo (JP); Kyushu Mushashi Seimitsu Kabushiki Kaisha, Kumamoto (JP)

( * ) Notice: Subject to any disclaimer, the term of this patent is extended or adjusted under 35 U.S.C. 154(b) by 0 days.

(21) Appl. No.: 10/471,324

(22) PCT Filed: Jan. 17, 2003

(86) PCT No.: PCT/JP03/00343
§ 371 (c)(1),
(2), (4) Date: Sep. 9, 2003

(87) PCT Pub. No.: WO03/062660
PCT Pub. Date: Jul. 31, 2003

(65) Prior Publication Data
US 2004/0089510 A1 May 13, 2004

(30) Foreign Application Priority Data
Jan. 25, 2002 (JP) ........................................ 2002-016999

(51) Int. Cl.$^7$ .............................................. F16D 41/06
(52) U.S. Cl. ...................................... 192/45; 188/82.84
(58) Field of Search ......................... 192/42, 45, 82.84; 188/82.84

(56) References Cited

U.S. PATENT DOCUMENTS

| | | | | |
|---|---|---|---|---|
| 4,415,072 A | * | 11/1983 | Shoji et al. ................... | 192/45 |
| 4,852,708 A | * | 8/1989 | Parkhurst ..................... | 192/45 |
| 5,099,972 A | * | 3/1992 | Ouchi .......................... | 192/45 |
| 5,779,015 A | | 7/1998 | Murata | |
| 6,138,804 A | * | 10/2000 | Tazumi et al. ................ | 192/45 |
| 6,311,814 B1 | | 11/2001 | Nakagawa et al. | |

FOREIGN PATENT DOCUMENTS

| | | |
|---|---|---|
| JP | 54-5157 | 1/1979 |
| JP | 07-083249 | 3/1995 |
| JP | 10-169673 | 6/1998 |
| JP | 10-227318 | 8/1998 |
| JP | 11-270594 | 10/1999 |
| JP | 2000-145829 | 5/2000 |
| JP | 2001-012512 | 1/2001 |

* cited by examiner

Primary Examiner—Richard M. Lorence
(74) Attorney, Agent, or Firm—Carrier, Blackman & Associates, P.C.; Joseph P. Carrier; William D. Blackman

(57) ABSTRACT

A one-way clutch includes an inner race, an outer race driven in a specific direction and provided with a plurality of pockets in its inner circumference facing the outer circumference of the inner race and threaded attachment holes to be used for attaching a driven member to the outer race, rollers respectively placed in the plurality of pockets, and elastic members pressing the rollers in a specific direction. A center angular interval between the middle pocket in any three successive ones of the pockets and the adjacent pocket on the forward side of the middle pocket, and an center angular interval between the middle pocket and the adjacent pocket on the backward side of the middle pocket are different from each other. Thus the distance between the front end surface of the pocket and the threaded attachment hole on the forward side of the pocket can be sufficiently large, and reduction of the rigidity of the outer race can be prevented without increasing the diameter of the outer race. The springs may be flat coil springs of a cross section having longer sides parallel to the longitudinal axis of the rollers, and a U-shaped spring caps each having a pair of side walls may be put on end on the side of the rollers of the springs, respectively.

14 Claims, 5 Drawing Sheets

ONE-WAY CLUTCH

TECHNICAL FIELD

The present invention relates to a one-way clutch including an inner race, an outer race, rollers arranged in a space between the inner and the outer races, and elastic members placed in the space between the inner and the outer races, and capable of transmitting power only in a specific direction.

BACKGROUND ART

FIG. 5 shows an essential part of a conventional one-way clutch in a sectional view by way of example. Referring to FIG. 5, a conventional one-way clutch 001 includes an inner race 002 rotated by external power, an outer race 003 surrounding the inner race 002 to transmit power to a driven member and provided with pockets 004, rollers 0005 placed in the pockets 004, and springs 006 pressing the rollers 005 in a specific direction.

In the following description, a direction in which the springs push the rollers is referred to as "forward direction". The bottom surfaces 004a, i.e., surfaces on the side of the outer circumference of the outer race among the surfaces of the pockets 004, are curved such that the depth of the pockets is smaller at the forward ends of the pockets 004. Thus, taper spaces tapering in a direction in which the springs 006 push the rollers are formed between the bottom surfaces 004a and the outer circumference of the inner race 002. While the one-way clutch is at a stand still, the rollers 005 pressed against the outer circumference of the inner race 002 and the bottom surfaces of the pockets 004 and held stationary in substantially middle parts of the pockets 004 by the springs 006. Stopping positions where the rollers are held stationary in the substantially middle parts of the pockets will be referred to as "standard roller-stopping positions" in the following description.

The rollers 005 jam into the forward tapered space formed between the outer circumference of the inner race 002 and the bottom surfaces 004a of the pockets 004 when the inner race 002 rotates in the direction of the arrow W. Consequently, power is transmitted from the inner race 002 to the outer race 003 to rotate the outer race 003 in the direction of rotation of the inner race 002. A driven member is fastened to the outer race 003 by screwing bolts, not shown, in threaded holes 003a formed in the outer race 003. Thus, the driven member is rotated by the power transmitted to the outer race 003. When the inner race 002 rotates in a direction opposite to the direction of the arrow W relative to the outer race 003, the rollers 005 are released and power is not transmitted.

Generally, the three rollers 005 are arranged at equal center angular intervals (angular intervals about the center axis) so that the rollers 005 are evenly in contact with the inner race. When the one-way clutch is loaded with a large load, the number of the rollers is doubled. The number of the pockets 004 is equal to that of the rollers. Similarly, the number of the threaded holes 003a is three to attach the driven member to the outer race stably. The threaded holes 003a are at equal distances from the center of the outer race and are arranged at equal center angular intervals. The one-way clutch shown in FIG. 5 is provided with the six rollers, the six pockets and the three threaded holes.

Buffer clearances are secured in front of the rollers 005 in the pockets 004 defining the forward tapered spaces to absorb dimensional errors in the bottom surfaces of the pockets 004 and the outer circumference of the inner race. Therefore, the rollers 005 never come into contact with the front end surfaces 004b of the pockets.

The positional relation between the standard roller-stopping position and the pocket 004 is the same for all the pockets. The center angular intervals between the adjacent pockets 004 are equal to the center angular intervals between the adjacent standard roller-stopping positions. In the conventional one-way clutch, the center angular intervals between the adjacent ones of the six pockets are 60°, and the center angular intervals between the adjacent ones of the three threaded holes 003a are 120°.

In a one-way clutch of a certain nominal size provided with pockets arranged at equal center angular intervals, the distance d between the threaded hole 003a and the corresponding pocket 004 was 2 mm. The distance d seemed to be excessively small in view of the rigidity of the outer race and it was considered that the distance must be somewhat greater than 2 mm.

To increase the capacity of the one-way clutch, the outside diameter of the inner race must be increased, and the rollers must be shifted radially outward accordingly. If the outside diameter of the outer race 003 is increased and the threaded holes 003a are shifted radially outward, the size of a device provided with the one-way clutch increases, which is undesirable. If the threaded holes 003a formed in the outer race 003 provided with the plurality of pockets are not shifted radially outward, the distance d between the threaded holes 003a and the corresponding front end surfaces 004b is reduced, which reduces the rigidity and is undesirable.

The present invention is intended to provide means for securing a sufficiently long distance between the threaded holes and the corresponding front end surfaces of the pockets in a one-way clutch including an outer race provided with a plurality of pockets, to prevent the reduction in strength of the outer race without enlarging the outer race and to achieve space saving.

On the other hand, the conventional one-way clutch required highly accurate work, which includes fabrication of high-precision spring caps having a highly precise outer diameter and machining of an insertion hole having a highly precise inner diameter to ensure smooth sliding movement of the spring cap within the insertion hole. This highly accurate work inevitably increased the manufacturing costs and man-hour requirements. Further, in the case where a large number of pockets are formed in the outer race, the outer diameter of the outer race had to be increased to avoid close arrangement of the insertion holes and the pockets.

SUMMARY OF THE INVENTION

The present invention has been made to solve the foregoing problems and provides a one-way clutch including: an inner race; an outer race driven for rotation in a specific direction, and provided with a plurality of pockets in its inner circumference facing the outer circumference of the inner race, and threaded attachment holes to be used for attaching a driven member to the outer race; rollers respectively placed in the plurality of pockets, and elastic members pressing the rollers in the specific direction, wherein power is transmitted in one direction between the inner and outer races; and at least one of center angular intervals of adjoining pockets among the plurality of pockets is different from center angular intervals of other adjoining pockets.

Since the center angular interval between some adjacent pockets is different or greater than those between the other pockets, the distance between the threaded attachment hole formed in the outer race and the pocket of the outer race can be increased, which is effective in preventing the reduction of the rigidity of the outer race.

The pockets may be divided into m pocket groups each of the n pockets spaced at center angular intervals of 360°/n, and the angular difference between at least one of the pocket groups and another pocket group is not equal to 360°/(m·n).

Thus, the center angular interval between some adjacent pockets is greater than the center angular intervals between the other pockets. Therefore, the threaded attachment hole formed in a part between the adjacent pockets spaced the greater center angular interval can be spaced a long distance apart from the pocket, which is effective in preventing the reduction of the rigidity of the outer race.

Typically, the elastic members are round coil springs, and round spring caps may be put on ends on the side of the rollers of the coil springs.

The elastic members may be springs, and U-shaped thin spring caps each having a pair of side walls may be put on ends on the side of the rollers of the springs, and the springs may be flat coil springs of a cross section having longer sides parallel to the length of the rollers.

Thus, each spring can be stably extended in a space having a rectangular cross section and defined by the opposite side walls of the spring cap and covers, so that the spring is prevented from obliquely pushing the roller.

Preferably, a first cover is joined to one of the side surfaces of the outer race and parts of the first cover are bent inward to form spring cap support parts that support the side walls of the spring caps. Preferably, a second cover is joined to the other side surface opposite to the side surface to which the first cover is joined of the outer race, and parts of the second cover are bent inward so as to engage elastically with the spring cap support parts.

Thus, the spring and the spring caps can be held by a simple manufacturing method, and the covers covering the opposite sides of the outer race can be prevented from falling off the outer race by a simple method.

In the present invention, there is also provided a one-way clutch comprising: an inner race; an outer race provided with a plurality of pockets in its inner circumference facing the outer circumference of the inner race rollers respectively placed in the plurality of pockets; and elastic members pressing the rollers in a specific direction, wherein power is transmitted in one direction between the inner and outer races; the elastic members are springs; and U-shaped thin spring caps each having a pair of side walls are put on ends of the springs on the side of the rollers.

The conventional one-way clutch requires highly accurate work and troublesome assembling work. On the other hand, the spring caps configured as above do not require bores. The spring caps can be formed by sheet metal working so that the spring caps can be manufactured far more easily by fewer processes than conventional spring caps. Thus, an outer race provided with a great number of pockets can be economically manufactured.

DETAILED DESCRIPTION OF THE INVENTION

Figure 1:
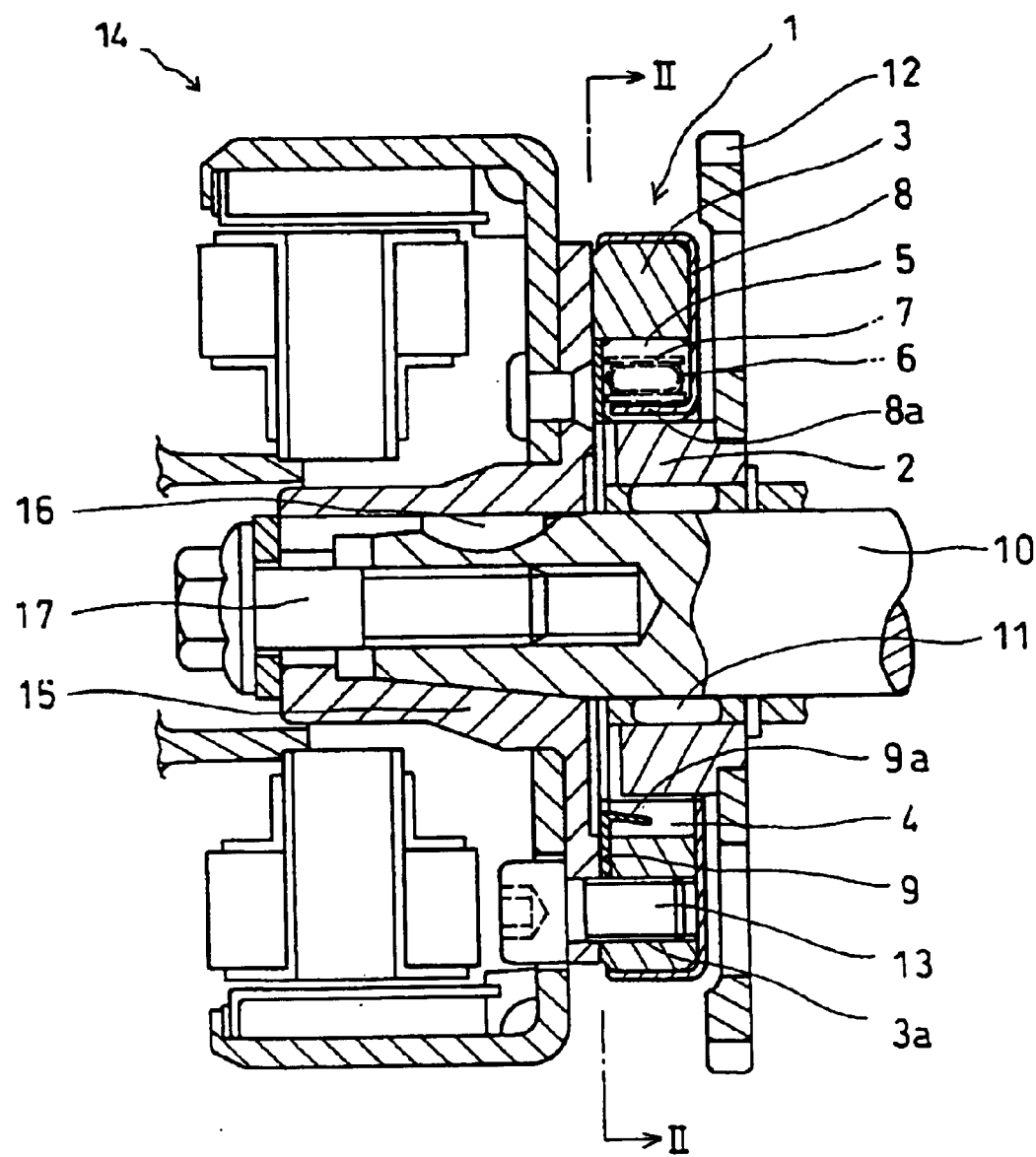
FIG. 1 is a longitudinal sectional view, taken on line I—I in FIG. 2, of a one-way clutch in a preferred embodiment according to the present invention and members associated with the one-way clutch.
Figure 2:
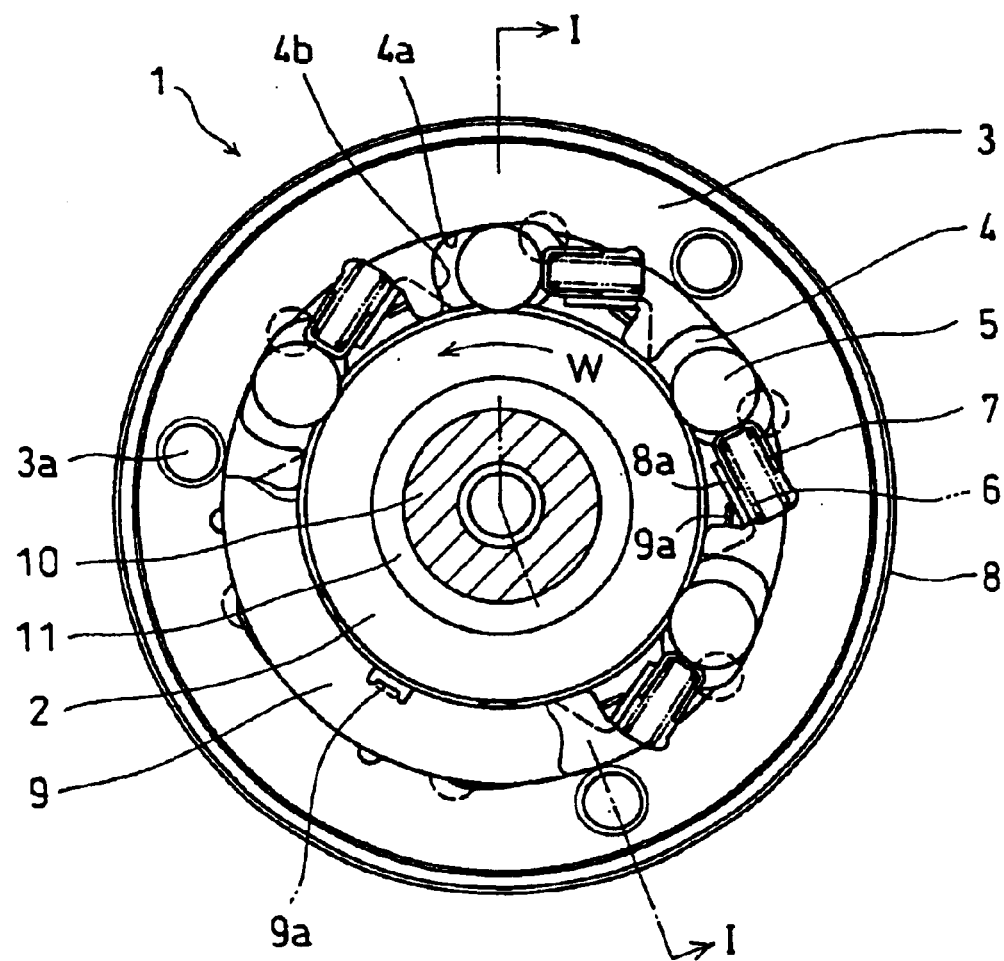
FIG. 2 is a sectional view taken on line II—II in FIG. 1.

FIGS. 1 and 2 illustrate a one-way clutch applied to an internal combustion engine for a vehicle to transmit the power of a starter motor to a generator and a crankshaft.

The one-way clutch 1 has an inner race 2 supported by a needle bearing 11 on one end of a crankshaft 10, an outer race 3 surrounding the inner race 2 to transmit power to a driven member and provided with pockets 4 in its inner circumference, rollers 5 respectively placed in the pockets 4 of the outer race 3, coil springs 6 respectively pressing the rollers 5 in a specific direction, cylindrical spring caps 7 respectively put on ends of the coil springs 6, a cover 8 covering the outer circumference and one of the side surfaces of the outer race so as to cover open sides of the pockets, and another cover or annular plate 9 set in contact with the other side surface of the outer race so as to cover the other open sides of the pockets. Parts of the cover 8 are bent to form support parts 8a underlying the spring caps 7, i.e., extending on the radially inner side of the spring caps 7. Parts of the annular plate 9 are bent in an axial direction to form retaining parts 9a elastically engaged with the lower surfaces of the support parts 8a to prevent the cover 8 and the annular plate 9 from coming off the outer race 3. In FIG. 2, the annular plate 9 is partly cut away to show the rollers 5 and the coil springs 6.

A sprocket 12 is fixedly mounted on a boss of the inner race 2. Rotative driving force of a starter motor, not shown, is transmitted through a chain, not shown, and the sprocket 12 to the one-way clutch 1.

The outer race 3 is provided with threaded attachment holes 3a. A rotating unit 15, i.e., the driven member, included in a generator 14 is fastened to the outer race 3 by screwing attachment bolts 13 in the threaded attachment holes 3a. The rotating unit 15 restrained from rotating relative to the crankshaft 10 by a machine key 16 and is held fixedly in place on the crankshaft 10 by a bolt 17. Thus, the output of the one-way clutch is transmitted to the crankshaft 10.

Each of the pockets 4 has a bottom surface 4a, i.e., a surface on the side of the outer circumference of the outer race 3, curved such that the depth of the pocket 4 is smaller at the forward end of the pocket 4. Thus, a taper space tapering in a direction in which the coil spring 6 pushes the roller 5 is formed between the bottom surfaces 4a and the outer circumference of the inner race 2. While the one-way clutch is at stand still, the rollers 5 pressed against the outer circumference of the inner race 2 and the bottom surfaces 4a of the pockets 4 and held stationary in substantially middle parts of the pockets 4 by the coil springs 6. Stopping positions where the rollers are held naturally stationary, i.e., the standard roller-stopping positions, are in the substantially middle parts of the pockets 4.

The rollers 5 jam into the forward tapered space formed between the outer circumference of the inner race 2 and the bottom surfaces 4a of the pockets 4 when the inner race 2 rotates in the direction of the arrow W. Consequently, the outer race 3 rotates together with the inner race 2 for power transmission. Then, power is transmitted from the outer race through the attachment bolts 13 to the rotating unit 15 of the generator 14, and the crankshaft 10 to drive the same for rotation. When the inner race 2 rotates in a direction opposite to the direction of the arrow W relative to the outer race 3, the rollers 5 are released and power is not transmitted.

Figure 5:
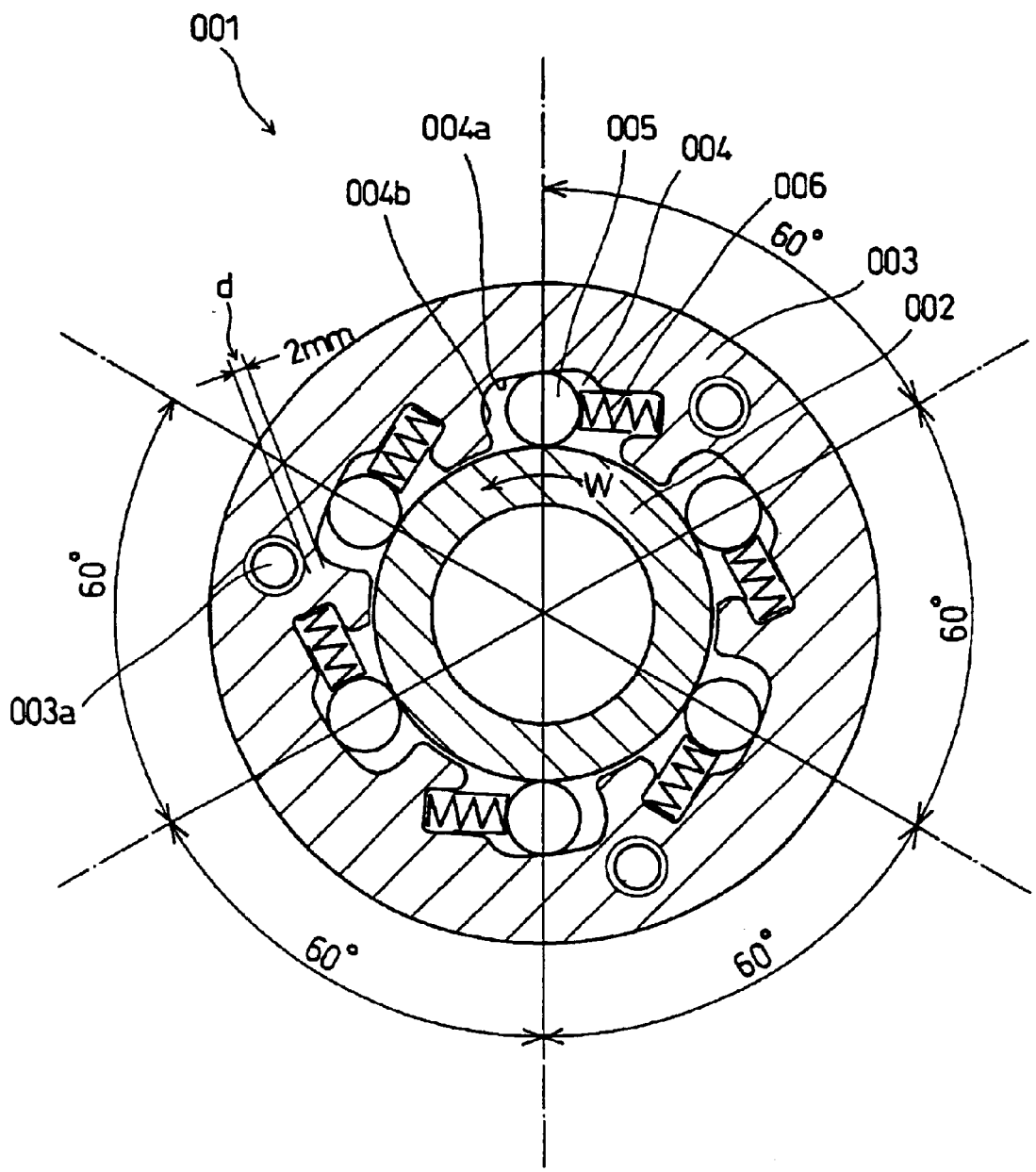
FIG. 5 is a sectional view of assistance in explaining the arrangement of pockets in a conventional one-way clutch.

In the conventional one-way clutch of FIG. 5, six pockets 4 are arranged at equal center angular intervals; that is, all the angular distances between the standard roller-stopping positions of the adjacent pockets are 60°. Therefore, the threaded attachment holes 3a are at a short distance from the front ends 4b of the corresponding pockets, which affects adversely to the rigidity of the outer race.

Figure 3:
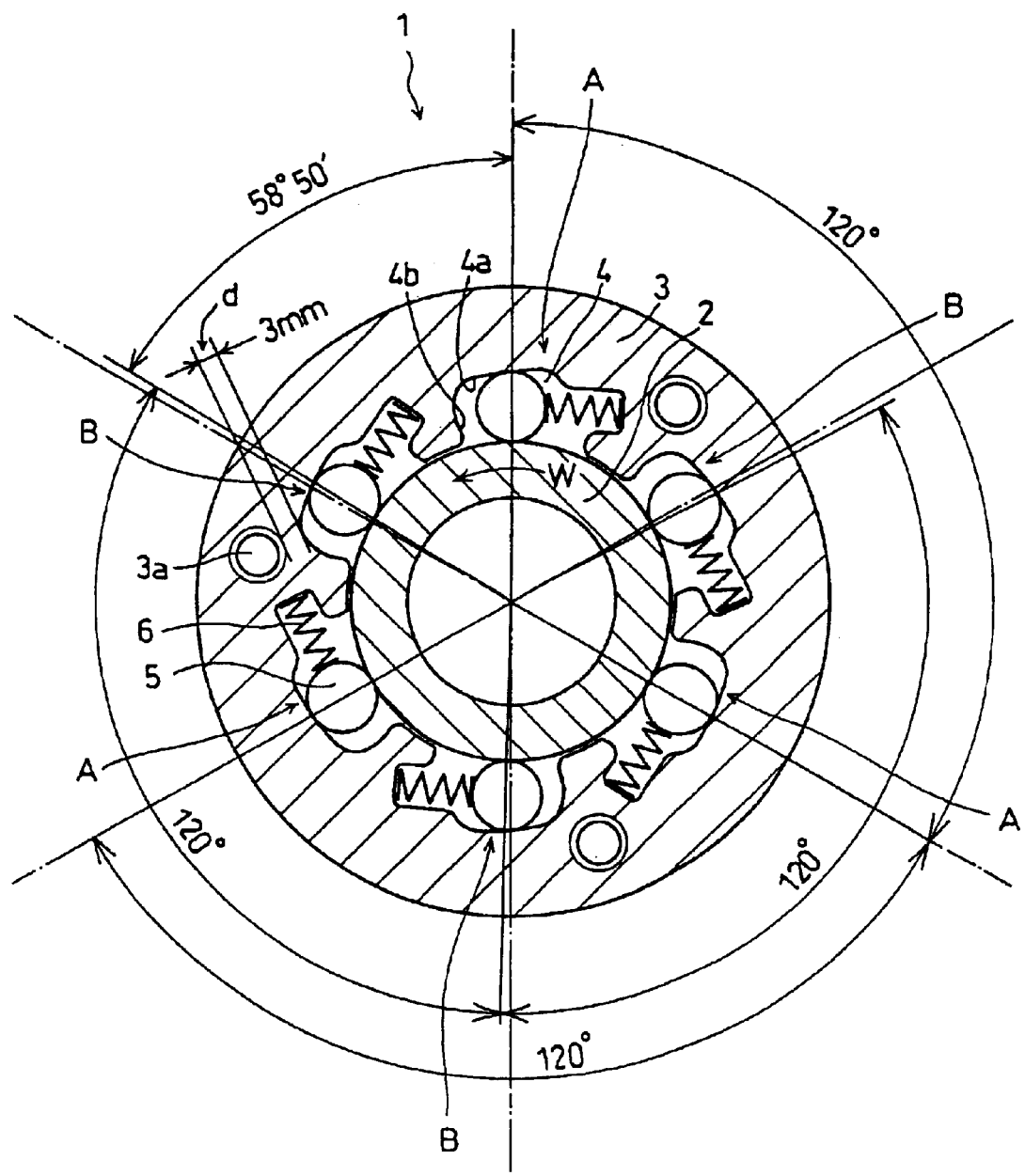
FIG. 3 is a view of assistance in explaining the arrangement of pockets in the one-way clutch shown in FIG. 1.

FIG. 3 is a view explaining the arrangement of pockets in the one-way clutch in this embodiment, in which parts irrelevant to the explanation are omitted, and the coil springs are shown schematically. The positional relation between the standard roller-stopping position and the corresponding pocket 4 is the same for all the pockets, and the angular distance between the adjacent pockets 4 is expressed by the angular distance between the standard roller-stopping positions in the adjacent pockets.

The three threaded attachment holes 3a of this embodiment, similarly to those of the conventional one-way clutch, are formed on a circle at center angular intervals of 120°. The six pockets are arranged on a circle and are divided into two pocket groups, i.e., first and second pocket groups, each consisting of three of the pockets.

The three first pockets A of the first pocket group are arranged at center angular intervals (angular intervals about the center axis) of 120°, and the positional relation between the three first pockets A of the first group and the threaded attachment holes 3a is the same as that in the conventional one-way clutch shown in FIG. 5. The three second pockets B of the second pocket group are arranged at center angular intervals of 120°. As obvious from FIG. 3, the three first pockets A of the first pocket group and the three second pockets B of the second pocket group are arranged alternately, and the second pockets B of the second pocket groups are shifted clockwise, as viewed in FIG. 3, relative to the first pockets A of the first pocket group, i.e., away from the adjacent threaded attachment holes 3a, such that the center angular interval between each second pocket B and the adjacent first pocket A on the backward side of the second pocket B is smaller than 60°, for example, 58°50', and the center angular interval between each second pocket B and the adjacent first pocket A on the forward side of the second pocket B is greater than 60°, for example, 61°10'. Thus, the second pockets B of the second pocket group are shifted away from the corresponding threaded attachment holes 3a. Consequently, the distance d (FIG. 3) between the front end surface 4b of each second pocket B of the second pocket group and the threaded attachment hole 3a on the forward side of the same second pocket B is greater than the distance d (FIG. 5) in the conventional one-way clutch.

In a conventional one-way clutch of a certain nominal size, in which the pockets were arranged at equal center angular intervals, the distance d between the front end surface of a second pocket and an threaded attachment hole 3a on the forward side of the same pocket was 2 mm. In a one-way clutch according to the present invention of the same nominal size having an outside diameter equal to that of the foregoing conventional one-way clutch, in which pockets were divided into first pockets of a first pocket group and second pockets of a second pocket group and the pockets of the first and the second pocket group were formed in an arrangement as mentioned in connection with the one-way clutch in the preferred embodiment, the distance d between the front end surface of the second pocket and an threaded attachment hole on the forward side of the second pocket was 3 mm. Thus, the reduction of the rigidity of the outer race could be prevented without increasing the diameter of the outer race, which is effective in saving space for installation and in improving the quality of the one-way clutch.

The one-way clutch in the preferred embodiment is characterized in that the pockets are divided into the three first pockets of the first pocket group arranged at the equal center angular intervals of 120° and the three second pockets of the second pocket group arranged at the equal center angular intervals of 120°, and the center angular interval between each second pocket and the adjacent first pocket on the backward side of the second pocket is not 60°. Generally, when a one-way clutch has m pocket groups each of n pockets arranged at equal center angular intervals of 360°/n, and the center angular interval between each pocket of one of the pocket groups and a pocket on the backward side of the pocket of the former pocket group of another one of the pocket groups is not 360°/(m·n), the center angular interval between some adjacent pockets is greater than that between other adjacent□pockets. Therefore, the reduction of the rigidity of the outer race can be prevented by forming the threaded attachment hole in a part of the outer race between the adjacent pockets spaced an center angular interval apart greater than that between the other adjacent pockets from each other.

Generally, when the pockets are arranged irregularly at different center angular intervals, intervals between the pockets are irregular. Therefore, the threaded attachment hole and the adjacent pocket can be spaced by a distance sufficient for securing rigidity without increasing the diameter of the outer race by forming the threaded attachment hole in a part of the outer race between the adjacent pockets which are spaced a large center angular interval apart.

Fabrication of the conventional one-way clutch requires highly accurate work for forming spring caps in an accurate outside diameter and for forming bores in an accurate diameter in the pockets to make an accurate spring cap and to ensure the smooth movement of the spring cap. Associated and troublesome assembling work, which increases manufacturing costs and has problems in working efficiency. When the outer race is provided with a plurality of pockets, the side surfaces of the bores must be spaced apart from the pockets, which inevitably requires increasing the diameter of the outer race.

Figure 4A:
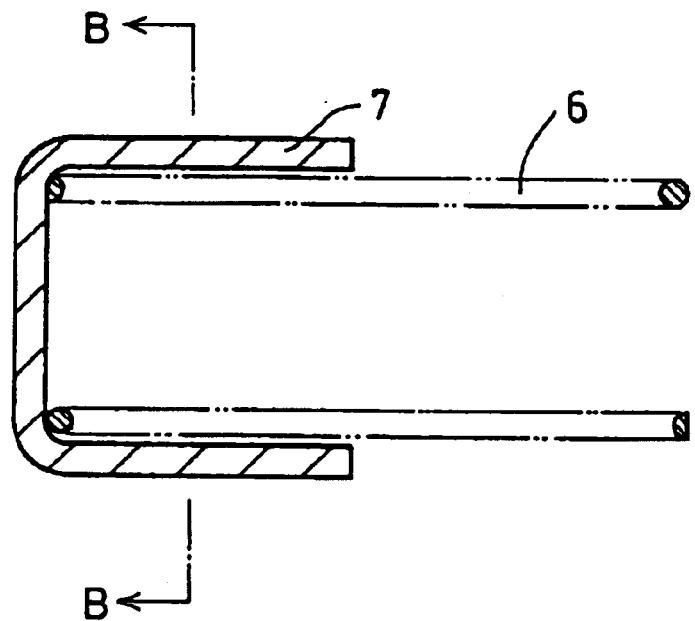
FIG. 4A is an enlarged sectional view of a coil spring and a spring cap put on the front end of the coil spring, in a modification according to the present invention.
Figure 4B:
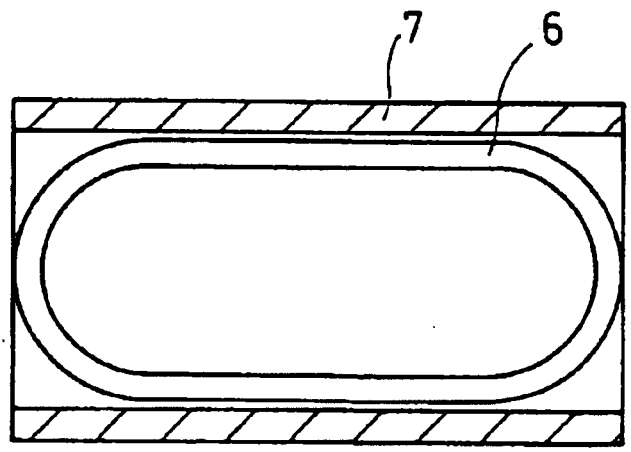
FIG. 4B is a sectional view taken on line B—B in FIG. 4A.

FIGS. 4A and 4B shows the coil spring 6, and a spring cap 7 in a modification of the present invention, put on the front end of the coil spring 6. FIG. 4A is a longitudinal sectional view and FIG. 4B is a sectional view taken on line B—B in FIG. 4A. The coil spring 6 is a flat coil spring having a substantially oval cross section formed by replacing the two shorter sides of a rectangle with circular arcs as shown in FIG. 4B. The longer sides of the cross section of the flat coil spring 6 are parallel to the length of the roller 5. The spring cap 7 is formed by bending a plate in a U-shape to define opposite□side walls. The side walls of the spring cap 7 cover the flat side surfaces of the□flat coil spring 6.

Parts of the cover 8 may be bent inward to form support parts 8a for supporting the lower side walls, i.e., side walls on the side of the crankshaft, of the U-shaped spring caps 7. Parts of the annular plate 9 may be bent inward so that the bent parts are engaged elastically with the lower surfaces of the support parts 8a to prevent the cover 8 and the annular plate from coming off the outer race 3.

The conventional one-way clutch requires highly accurate work for forming bores in the outer race to insert the springs each applied with the spring cap from the outer circumference of the outer race through the bores in the pockets, and troublesome assembling work. The spring caps in this modification according to the invention do not need bores. The spring caps formed by sheet metal working can be manufactured far more easily by fewer processes than conventional spring caps. Thus, an outer race provided with a great number of pockets can be economically manufactured.

Since the longer sides of the cross section of each flat coil spring are parallel to the length of the roller, the flat coil spring can be held in a stable position in a space of a rectangular cross section defined by the upper and lower side walls of the spring cap, the cover and the annular plate to prevent the flat coil spring from obliquely pressing the roller.

The support parts 8a can be easily formed by bending parts of the cover 8 inward, and the retaining parts 9a can be easily formed by bending parts of the annular plate 9; nevertheless the support parts 8a and the retaining parts 9a are sufficiently effective in preventing the cover and the annular plate from coming off the outer race.

Although there has been described what is the present embodiment of the invention, it will be understood by persons skilled in the art that variations and modifications may be made thereto without departing from the spirit or essence of the present invention.

We claim:

1. A one-way clutch comprising: an inner race; an outer race provided with a plurality of pockets in its inner circumference facing an outer circumference of the inner race and attachment boles to be used for attaching a driven member to the outer race; rollers respectively placed in the plurality of pockets; and elastic members pressing the rollers in a specific direction, wherein power is transmitted in one direction between the inner and outer races; and wherein at least one of center angular intervals of adjoining pockets among said plurality of pockets is different from center angular intervals of other adjoining pockets.

2. The one-way clutch according to claim 1, wherein the pockets are divided into m pocket groups each including n pockets spaced at center angular intervals of 360°/n, and an angular difference between at least one of the pocket groups and another pocket group is not equal to 360°/(m·n).

3. The one-way clutch according to claim 1, wherein the elastic members are coil springs, and spring caps are put on ends of the coil springs facing toward the rollers.

4. The one-way clutch according to claim 1, wherein the elastic members are springs, and U-shaped thin spring caps each having a pair of side walls are put on ends of the springs facing toward the rollers.

5. The one-way clutch according to claim 4, wherein the springs are flat coil springs of a cross sectional shape having longer sides parallel to longitudinal axes of the rollers.

6. The one-way clutch according to claim 4, wherein a first cover is joined to one side surface of the outer race and parts of the first cover are bent inward to form spring cap support parts that support the side walls of the spring caps.

7. The one-way clutch according to claim 6, wherein a second cover is joined to another side surface opposite to the side surface to which the first cover is joined, and parts of the second cover are bent inward so as to engage elastically with the spring cap support parts.

8. The one-way clutch according to claim 1, wherein
the elastic members are springs, and U-shaped thin spring caps each having a pair of side walls are put on ends of the springs facing toward the rollers.

9. The one-way clutch according to claim 8, wherein the springs are flat coil springs of a cross sectional shape having longer sides parallel to longitudinal axes of the rollers.

10. The one-way clutch according to claim 8, wherein a first cover is joined to one side surface of the outer race and parts of the first cover are bent inward to form spring cap support parts that support the side walls of the spring caps.

11. The one-way clutch according to claim 10, wherein a second cover is joined to another side surface of the outer race opposite to the side surface to which the first cover is joined, and parts of the second cover are bent inward so as to engage elastically with the spring cap support parts.

12. The one-way clutch according the claim 3, wherein the spring and spring caps are round.

13. The one-way clutch according to claim 2, wherein the pockets of each said pocket group are arranged alternatively with the pockets of the other said pocket groups.

14. The one-way clutch according to claim 1, wherein a center angular interval between a middle one of any three successive ones of said pockets and an end one of the three successive pockets is different than a center angular interval between said middle one of the pockets and opposite end one of the three successive pockets.

* * * * *